United States Patent Office 2,822,311
Patented Feb. 4, 1958

2,822,311

FABRIC RUBBER MEMBER AND MEANS FOR IMPROVING FABRIC-RUBBER ADHESION

Walter C. Rowe and John I. Stearns, Akron, Ohio, assignors to The Firestone Tire & Rubber Company, Akron, Ohio, a corporation of Ohio No Drawing. Application March 3, 1955
Serial No. 492,018

11 Claims. (Cl. 154—139)

This invention relates to the adhesion of isoolefin-polyolefin copolymers to cord fabric and more particularly to means for adhering so-called Butyl type rubber to cord fabric to make an improved butyl rubber-fabric article such as a tire.

Although pneumatic tires have been made from some types of synthetic rubber, the rubber industry has attempted without success to manufacture a commercially satisfactory tire having rubbery components composed entirely of a vulcanized rubbery isoolefin-polyolefin copolymer known as Butyl rubber. Such a tire would invariably fail during operation because of separation of the vulcanized rubbery copolymer compounds from the fabric strain members. Conventional means for obtaining rubber to fabric adhesion failed when Butyl rubber was used and a satisfactory tire was not produced.

Butyl rubber is the commercial name for copolymers of isobutylene with small amounts of butadiene or isoprene. The present invention applies not only to the so-called Butyl type rubbers but broadly to solid rubbery copolymers of a major portion of an isoolefin such as isobutylene with a minor portion of a polyolefin containing one or more double bonds. Such copolymers are described in U. S. Patents 2,322,073; 2,356,128; 2,356,129; 2,356,130; 2,373,706; 2,384,975; 2,418,912 and 2,568,656.

The disadvantages of the prior art are overcome in the present invention by dipping the fabric cord in an aqueous solution of a mixture of phenol-aldehyde resin with a blend of butadiene-styrene and vinyl-pyridine latex, drying the fabric, redipping it in a solution of a brominated polymeric material containing an isoolefin hydrocarbon in suitable solvent and pressing the treated cord in abutting relation with an element of a vulcanizable rubbery copolymer of a major portion of an isoolefin and a minor portion of a polyolefin while applying vulcanizing heat and pressure.

It is therefore an object of this invention to adhere an element of a vulcanizable rubbery copolymer of a major portion of an isoolefin and a minor portion of a polyolefin to cord fabric.

Another object of the invention is to adhere an element of a vulcanizable rubbery copolymer of isobutylene and a minor portion of a diolefin to cord fabric.

Yet a further object of the invention is to provide a method of adhering Butyl type rubber to rayon cord fabric to make an improved tire.

A further object of the invention is to provide an improved strain member for a tire of butyl rubber.

The brominated copolymers used in the present invention contain 1 to 10% and sometimes as high as 50% bromine and are disclosed and described in U. S. Patent 2,631,984 to Crawford et al.

In view of the invention sheets of cord fabric such as rayon cord fabric were passed through an aqueous solution of a mixture of a phenol-aldehyde resin such as resorcinol-formaldehyde with a blend of butadiene-styrene latex with vinyl-pyridine latex and allowed to dry.

The dried fabric was passed next through a solution comprised of a brominated copolymer of isobutylene and isoprene dissolved in xylene and the xylene was allowed to evaporate. The cords thus treated were passed next through a conventional rubber calender and a sheet of vulcanizable rubbery compound containing Butyl type rubber was squeezed between and against the cords to form lengths of vulcanizable rubberized fabric which were built into a tire in a conventional manner. The tire was shaped and vulcanized and when road tested performed satisfactorily.

A typical formula for the aqueous solution of resorcinol-formaldehyde mixed with butadiene-styrene, vinyl pyridine latex is as follows all parts being by weight of latex:

Example I

| | |
|---|---|
| Butadiene styrene-vinyl pyridine latex | 100 |
| Resorcinol | 9.00–12.50 |
| Formaldehyde (35% water solution) | 7.60– 9.60 |
| Sodium hydroxide (50% water solution) | 1.20– 3.50 |
| Carbon black | 2.00–10.00 |
| | [1] 119.80–135.60 |

[1] Dissolve in water to 12 to 18% by weight solids content.

The second solution of the invention is comprised of brominated polymeric material essentially of an isoolefin and preferably of an isobutylene either polymerized with itself or copolymerized with a conjugated diolefin such as butadiene or isoprene. Examples of such a solution are as follows:

Example II

| | Formula 1 | Formula 2 | Formula 3 | Formula 4 |
|---|---|---|---|---|
| Brominated Butyl (Hycar HD*) | 100.00 | 100.00 | 100.00 | 100.00 |
| Carbon Black | 65.00 | 65.00 | 65.00 | 75.00 |
| Polyac** | .40 | .40 | | |
| Stearic Acid | .40 | .40 | .40 | .40 |
| Softener | 3.00 | 3.00 | 3.00 | 3.00 |
| Sulfur | 2.00 | 2.00 | 2.00 | 2.00 |
| Zinc Oxide | 5.00 | 5.00 | 5.00 | 5.00 |
| Accelerator | 2.00 | 2.00 | 1.00 | 1.00 |
| Paraformaldehyde | 5.00-15.00 | | | |

*Brominated copolymer of isobutylene-isoprene manufactured and sold by the B. F. Goodrich Company.
**Polyparadinitrosobenzene.

The ingredients for the above stocks may be mixed on an open mill and dissolved in a mixture of 95% naphtha and 5% isopropyl alcohol until a solution having solids concentration of 15% by weight is obtained.

In one modification of the invention about 10 parts of resorcinol based on the weight of polymer present is added to the compound of Formula #1 and the solution stirred for about one hour. The solution is allowed to stand 24 hours and is applied to the cords by painting or dipping.

The above formulations are given by way of example only and it will be recognized by those skilled in the art that proportions of ingredients may be varied to acquire different properties in the dip. Obviously changes in concentrations of such ingredients as sulfur and accelerator will vary vulcanization behavior of the compound as well as the properties of the vulcanizate. Such variations as well as the variation of other standard ingredients lie within the knowledge and skill of those working in the rubber art.

To further test the invention a sheet of rayon cord was dipped in an aqueous solution comprised of resorcinol and formaldehyde mixed with a blend of butadiene-styrene latex with vinyl-pyridine latex essentially according to Example 1. The cords were dried at approximately 230° F. and dipped in a solution of brominated butyl type rubber dissolved in xylene as shown in Formula 2 of Example II. The xylene was allowed to evaporate and the cords were cut to 3¼ in. lengths and laid on a slab of a vulcanizable butyl type rubber compound 1½ in. wide by 6 in. long by ⅛ in. thick with 1¾ inches of cord protruding from the edge of the slab. A second slab of Butyl type rubber compound was laid across the cords and on the first slab to sandwich the cords between the two slabs with the cord ends protruding 1¾ inches to form a pad which was vulcanized under pressure in a platen press. After vulcanization a cut was made ⅚₆ of an inch back from the edge of the pad through the top layer of rubber and the cords but not through the bottom layer of rubber. A control sample was run using cords treated with the brominated Butyl dip but not with the resin latex dip. Each cord so cut was pulled from the rubber material of the pad in a Scott Cord Testing Machine with the following adhesion noted:

|  | Cold Test, lbs. | Hot Test,* lbs. |
| --- | --- | --- |
| Cord Control (Brominated Butyl dip but no resin latex dip) | 28 | 13 |
| Cord (Resin dip followed by dip of Brominated Butyl) | 50<br>45<br>49 | 35<br>29<br>29 |

*Ambient temperature of 230° F.

The combination of the two dips shows greatly improved rayon cord to Butyl rubber adhesion over the use of the brominated Butyl rubber dip alone.

An example of a vulcanizable rubbery compound such as a tire body stock which is readily adhered to cords treated in the novel manner is as follows:

| | |
| --- | --- |
| Butyl rubber (GRI–18) | 100.00 |
| Carbon black | 50.00 |
| Stearic acid | .50 |
| Softener | 12.00 |
| Zinc oxide | 5.00 |
| Sulfur | 2.00 |
| Accelerator | 2.00 |
| Polyac* | .50 |

*Polyparadinitrosobenzene.

A rubbery material of the above formulation when mixed in conventional rubber mixing equipment and calendered on rayon fabric dipped in the manner of the invention showed excellent adhesion to the cord while a tire made from this material performed satisfactorily.

Variations in the amount of bromine in the brominated Butyl composition have a marked effect on adhesion.

A 5% solution of bromine in carbon tetrachloride was prepared and various proportions of this solution were added to solutions of an unbrominated butyl rubber cement similar to Formula 2 of Example II. The resulting cements had proportions of bromine in the butyl as follows:

|  | A | B | C | D |
| --- | --- | --- | --- | --- |
| Wt. bromine grams | 20 | 10 | 5 | 1.25 |
| Butyl rubber cement do | 200 | 200 | 200 | 200 |
| Percent Bromine/100% Butyl rubber (By weight) | 17.8 | 8.9 | 4.5 | 1.1 |

The adhesion of cords treated with the above brominated cements to a butyl tire body stock in the aforedescribed manner was as follows:

|  | A | B | C | D |
| --- | --- | --- | --- | --- |
| Cold Adhesion | 49 | 45 | 42 | 39 |
| Hot Adhesion (230° F.) | 30 | 28 | 25 | 24 |

Although a range of from 1% to 50% bromine based on the weight of butyl shows valuable improvement in fabric to butyl rubber adhesion, a range of from 5 to 30% by weight of bromine is preferred.

In addition to a blend of butadiene-styrene latex with vinyl pyridine latex in various proportions, the invention contemplates the use of a latex formed by the copolymerization of butadiene, styrene and vinyl pyridine in ratios respectively of from 60–70%, 15–30% and 5–20%. Other blends and copolymers of these materials are commercially available and are within the scope of and find use in the invention.

Butyl type polymers which when brominated are satisfactory in the invention include copolymers of from 70 to 99% by weight of an isoolefin containing 4 to 8 carbon atoms such as isobutylene, 3 methyl butene-1, 2-ethyl butene-1, 4-ethyl pentane-1, 4 ethyl hexene-1 or the like with a minor portion of an open-chain conjugated diolefin such as butadiene-1,3; isoprene; 2,4-dimethyl butadiene-1,3, piperylene, 3 methyl pentadiene-1,3, and the like.

While the drying temperature of the phenol-aldehyde-latex solution has been given by way of example as 230° F., the range is 220° F. to 280° F. and even higher temperatures are satisfactory when working with various modifications of the invention.

In addition to the mixture of naphtha and isopropyl alcohol used to disolve the brominated butyl compound other solvents may be used. Examples of such solvents are hexane, toluene, benzene, xylene, methyl ethyl ketone, dichloroethylene as well as commercially available mixtures of the foregoing and other solvents.

From the foregoing description it is apparent that various embodiments in addition those specifically disclosed may be adopted without departing from the scope of the invention in view of the prior art and the appended claims.

We claim:

1. A method of adhering a fabric cord to an element of vulcanizable isoolefin-diolefin rubbery copolymer comprising the steps of dipping said cord in an aqueous solution comprised of a mixture of a phenol-aldehyde resin with a butadiene styrene-vinyl pyridine latex, drying the cord, dipping the dry cord in a solution of a brominated rubbery copolymer of isobutylene and isoprene having a bromine content of from 5 to 30% by weight based on the weight of brominated copolymer before bromination, again drying the cord, and holding said cord against said rubbery element while applying vulcanizing heat and pressure.

2. A method of adhering a sheet of synthetic filamentary material to a sheet of a vulcanizable rubbery copolymer of a major portion of an isololefin with a minor portion of diolefin comprising the steps of dipping said filamentary sheet in an aqueous solution comprised of a mixture of a phenol-aldehyde resin with a butadiene styrene-vinyl pyridine latex, drying the filamentary sheet, dipping the dry filamentary sheet in a solution of a brominated copolymer of a major portion of isoolefin with a minor portion of a diolefin, said copolymer having a bromine content not exceeding 50% by weight based on the weight of the brominated copolymer before bromination, again drying the filamentary sheet and holding said filamentary sheet against said rubbery sheet while applying vulcanizing heat and pressure.

3. A method of adhering a sheet of synthetic filamentary material to an element of a vulcanizable isoolefin-diolefin rubbery copolymer comprising the steps of dipping said filamentary sheet in an aqueous solution comprised of a mixture of a phenolaldehyde resin with a butadiene styrene-vinyl pyridine latex, drying the sheet, dipping the dry sheet in a solution of a brominated copolymer of a major portion of isobutylene with a minor portion of isoprene, said brominated copolymer having a bromine content not exceeding 50% by weight based on the weight of brominated copolymer before bromination, again drying the sheet, and holding said sheet against said rubbery element while applying vulcanizing heat and pressure.

4. A method of adhering a synthetic filamentary sheet to an element of isoolefin-diolefin rubbery copolymer comprising the steps of dipping said filamentary sheet in an aqueous solution comprised of a mixture of a phenol-aldehyde resin with a butadiene styrene-vinyl pyridine latex, drying the filamentary sheet at a temperature not exceeding 230° F., dipping the dry filamentary sheet in a solution of a brominated copolymer of a major portion of isobutylene with a minor portion of isoprene said brominated copolymer having a bromine content not exceeding 50% by weight based on the weight of brominated copolymer before bromination, again drying the filamentary sheet, and holding said filamentary sheet against said isoolefin-diolefin rubbery copolymer rubbery element while applying vulcanizing heat and pressure.

5. A method of adhering a synthetic cord to an element of vulcanizable isoolefin-diolefin rubbery copolymer comprising the steps of dipping said cord in an aqueous solution comprised of a mixture of a phenol-aldehyde resin with butadiene styrene-vinyl pyridine latex, drying the cord at a temperature of substantially 230° F., dipping the dried cord in a solvent solution of a brominated copolymer of a major portion of isobutylene with a minor portion of isoprene, said brominated copolymer having a bromine content of from 5–30% by weight of the brominated copolymer before bromination, again drying the cord and holding said cord against said isoolefin-diolefin rubbery copolymer rubbery element while applying vulcanizing heat and pressure.

6. In a pneumatic tire a cord of synthetic fabric material having a first coat of a mixture of a phenol-aldehyde resin with butadienne styrene-vinyl pyridine latex and a second coat covering said first coat comprised of a brominated rubbery copolymer of a major portion of isobutylene with a minor portion of isoprene, the bromine content of said copolymer not exceeding 50% by weight of the brominated copolymer before bromination.

7. In a tire comprised of an isoolefin-diolefin rubbery copolymer the combination of a synthetic filamentary element adhered to abutting elements of isoolefin-diolefin rubbery copolymer, said filamentary elements having a first coat comprised of a phenol-aldehyde resin with a butadiene-styrene vinyl pyridine latex covered by a second coat comprised of a brominated rubbery copolymer of a major portion of isobutylene with a minor portion of isoprene, the bromine content of said second coat not exceeding 50% by weight of the brominated copolymer before bromination.

8. A vulcanized composite article comprising textile cords embedded in a matrix of a vulcanized isoolefin-diolefin rubbery copolymer, a layer of a composition comprising a mixture of a phenol-aldehyde resin and a copolymer of a 1,3 diene monomer, styrene and vinyl pyridine impregnating and encasing each said cord, a coating over said layer comprised of a brominated rubbery copolymer of a major portion of an isoolefin and a minor portion of a diolefin having a bromine content not exceeding 50% by weight of the brominated copolymer before bromination interposed between and adhered to said layer and said matrix whereby said layer and said coating form a bond between the cord and the rubbery matrix.

9. A composite article according to claim 8 wherein the bromine content is from 5% to 30% by weight of brominated copolymer before bromination.

10. A vulcanized composite article comprising textile cords, a matrix of a vulcanizable isoolefin-diolefin rubbery copolymer surrounding each of said cords, a layer of a composition comprising a mixture of phenol-aldehyde resin with a copolymer of butadiene, styrene and vinyl pyridine impregnating and encasing each said cord, and a coat of a brominated rubbery copolymer of a major portion of an isoolefin and a minor portion of a diolefin having a bromine content not exceeding 50% by weight of said copolymer before bromination interposed between and bonded to both said layer and said matrix.

11. A method of adhering a fabric cord to an element of vulcanizing isoolefin-diolefin rubbery copolymer comprising the steps of dipping said cord in an aqueous solution comprised of a mixture of a phenol-aldehyde resin with a copolymer latex of butadiene, styrene and vinyl pyridine latex, the monomers in said latex being present in proportion to the total weight of latex in the amount of 60% to 70%, 15% to 30% and 5% to 20% respectively, drying the cord, dipping the dry cord in a solution of a brominated rubbery copolymer of isobutylene and isoprene having a bromine content not exceeding 50% by weight based on the weight of brominated copolymer before bromination, again drying the cord, and holding said cord against said rubber element while applying vulcanizing heat and pressure.

References Cited in the file of this patent

UNITED STATES PATENTS

| | | |
|---|---|---|
| 2,561,215 | Mighton | July 17, 1951 |
| 2,615,826 | Mallory et al. | Oct. 28, 1952 |
| 2,720,479 | Crawford et al. | Oct. 11, 1955 |
| 2,775,537 | Wilson et al. | Dec. 25, 1956 |